(12) United States Patent
Austin

(10) Patent No.: US 7,125,480 B2
(45) Date of Patent: Oct. 24, 2006

(54) METHODS FOR AFFECTING THE ULTRA-FAST PHOTODISSOCIATION OF WATER MOLECULES

(75) Inventor: Gary Austin, Tulsa, OK (US)

(73) Assignee: Austin & Neff, LLC, Tulsa, OK (US)

( * ) Notice: Subject to any disclaimer, the term of this patent is extended or adjusted under 35 U.S.C. 154(b) by 256 days.

(21) Appl. No.: 10/448,779

(22) Filed: May 29, 2003

(65) Prior Publication Data

US 2003/0183505 A1    Oct. 2, 2003

Related U.S. Application Data

(63) Continuation-in-part of application No. 10/065,429, filed on Oct. 16, 2002, which is a continuation-in-part of application No. 09/883,169, filed on Jun. 18, 2001, now abandoned.

(51) Int. Cl.
C25B 1/02 (2006.01)
C25B 1/04 (2006.01)
C25B 1/10 (2006.01)

(52) U.S. Cl. ............... 205/628; 205/633; 205/637; 205/521; 204/157.15; 204/157.5; 204/157.52; 204/278; 259/353

(58) Field of Classification Search ........ 205/628–639, 205/521; 204/157.1, 157.5, 278, 157.15, 204/157.52; 359/353
See application file for complete search history.

(56) References Cited

U.S. PATENT DOCUMENTS

| 4,094,751 A | 6/1978 | Nozik |
| 4,107,008 A | 8/1978 | Horvath |
| 4,121,984 A | 10/1978 | Gomberg et al. |
| 4,146,446 A * | 3/1979 | von Sturm .................. 205/638 |
| 4,342,738 A | 8/1982 | Burgund |
| 4,622,115 A | 11/1986 | O'Neill |
| 4,755,269 A | 7/1988 | Brumer et al. |
| 4,957,610 A | 9/1990 | Hawkins |
| 5,711,770 A | 1/1998 | Malina |
| 5,973,825 A * | 10/1999 | Lasich ........................ 359/353 |
| 6,063,258 A | 5/2000 | Sayama et al. |
| 6,187,202 B1 * | 2/2001 | Fish ........................... 210/652 |
| 6,235,186 B1 * | 5/2001 | Tanaka et al. .............. 205/521 |

OTHER PUBLICATIONS

Sander, Luther, Troe, "Excitation Energy Dependence of the Photoionization of Liquid Water" J. Phys. Chem., p. 11489 (1993).
Kantor, Long, Micci, "Molecular Dynamics Simulation of Dissociation Kinetics", AIAA Aero Sci. Mtg., No. 2000-0213 (2000).

(Continued)

*Primary Examiner*—Roy King
*Assistant Examiner*—Lois Zheng
(74) *Attorney, Agent, or Firm*—Fellers, Snider, Blankenship, Bailey & Tippens, P.C.; Scott R. Zingerman

(57) ABSTRACT

A method for the ultra-fast photodissociation of water molecules into $H_2$ and $O_2$ gases is presented. Water vapor is initially produced and supplied to a photolysis bottle. Within the photolysis bottle, the water vapor is illuminated by a light signal to dissociate $H_2$ and $O_2$ gases from the water vapor. The dissociated $H_2$ and $O_2$ gases are radiated with an RF signal to inhibit recombination of the dissociated $H_2$ and $O_2$ gases, and the dissociated $H_2$ and $O_2$ gases are subsequently recovered.

18 Claims, 4 Drawing Sheets

OTHER PUBLICATIONS

Miller, "Photophysics and Energy Thresholds," Electronic Compotational Chemistry Conf., Apr. 2-30 (2001).

Norizawa, Yada, Ikeya, "Does Liquid Water Have Traces of Irradiation . . . " Adv. in ESR Appl., vol. 18, pp. 233-237 (2002).

Derreault, "The Dissociation of Water by Radiant Energy," Nu Power Technologies, Rumney N.H. (1999).

* cited by examiner

METHODS FOR AFFECTING THE ULTRA-FAST PHOTODISSOCIATION OF WATER MOLECULES

CROSS REFERENCE TO RELATED APPLICATIONS

This application is a continuation-in-part application of U.S. patent application Ser. No. 10/065,429 entitled "Systems and Methods for Affecting the Ultra-Fast Photodissociation of Water Molecules," filed Oct. 16, 2002 and currently pending, which is itself a continuation in part application of U.S. patent application Ser. No. 09/883,169 entitled "PHD Header for the Production of Hydrogen Gas and Oxygen Gas from Seawater, with Advanced Steam Photolysis," filed Jun. 18, 2001, now abandoned. The contents of the aforementioned U.S. patent Ser. Nos. 10/065,429 and 09/883,169 are herein incorporated by reference in their entirety for all purposes.

BACKGROUND OF INVENTION

This invention relates to photodissociation processes in general, and to components, systems, and methods for affecting the ultra fast dissociation of a water molecule in particular.

Photodissociation of the water molecule $H_2O$ has been shown in the prior art using various approaches including catalysts, ultraviolet light, superheated steam and solar pumped lasers. Also described are systems employing photo-chemical diodes, photovoltaics, and various vessel configurations. Problems involved in these prior art systems have included volatility of hydrogen when obtained from superheated steam, excessive costs in systems using ultraviolet light sources, material and maintenance costs of systems employing catalysts, and the lack of gas purity in the gas separation process.

What is therefore needed are systems and methods for water molecule dissociation which provides lower gas volatility, higher gas purity, with lower equipment and maintenance costs.

SUMMARY OF INVENTION

The present invention provides methods for the ultra fast dissociation of the water molecule at relatively low temperatures (typically between 120–210° C.), and at higher purity. The present invention further provides for the use of lower cost, near infrared light sources that can be used to dissociate the water molecule, and radiolysis techniques which can be used to further increase dissociation efficiency and gas purity.

In a first embodiment of the present invention's method, water vapor is produced and supplied to a photolysis bottle. Within the photolysis bottle, the water vapor is illuminated by a light signal which acts to dissociate $H_2$ and $O_2$ gases from the water vapor. The dissociated $H_2$ and $O_2$ gases are radiated with an RF signal to inhibit their recombination, and the dissociated $H_2$ and $O_2$ gases are subsequently recovered.

In a second embodiment of the invention, an acidic water vapor is produced and supplied to a photolysis bottle. The acidic water vapor is illuminated by a light signal, thereby dissociating $H_2$ and $O_2$ gas from the acidic water vapor. The dissociated $H_2$ and $O_2$ gases are subsequently recovered.

In a third embodiment, water vapor is produced and supplied to a photolysis bottle. A light signal illuminates the water vapor, thereby dissociating $H_2$ and $O_2$ gases from the water vapor. The dissociated $H_2$ and $O_2$ gases are radiated with an RF signal to inhibit recombination, and the dissociated gases are then recovered using an anode and cathode.

Other advantages and aspects of the invention will be obtained from studying the following drawings and detailed description.

Figure 1A:
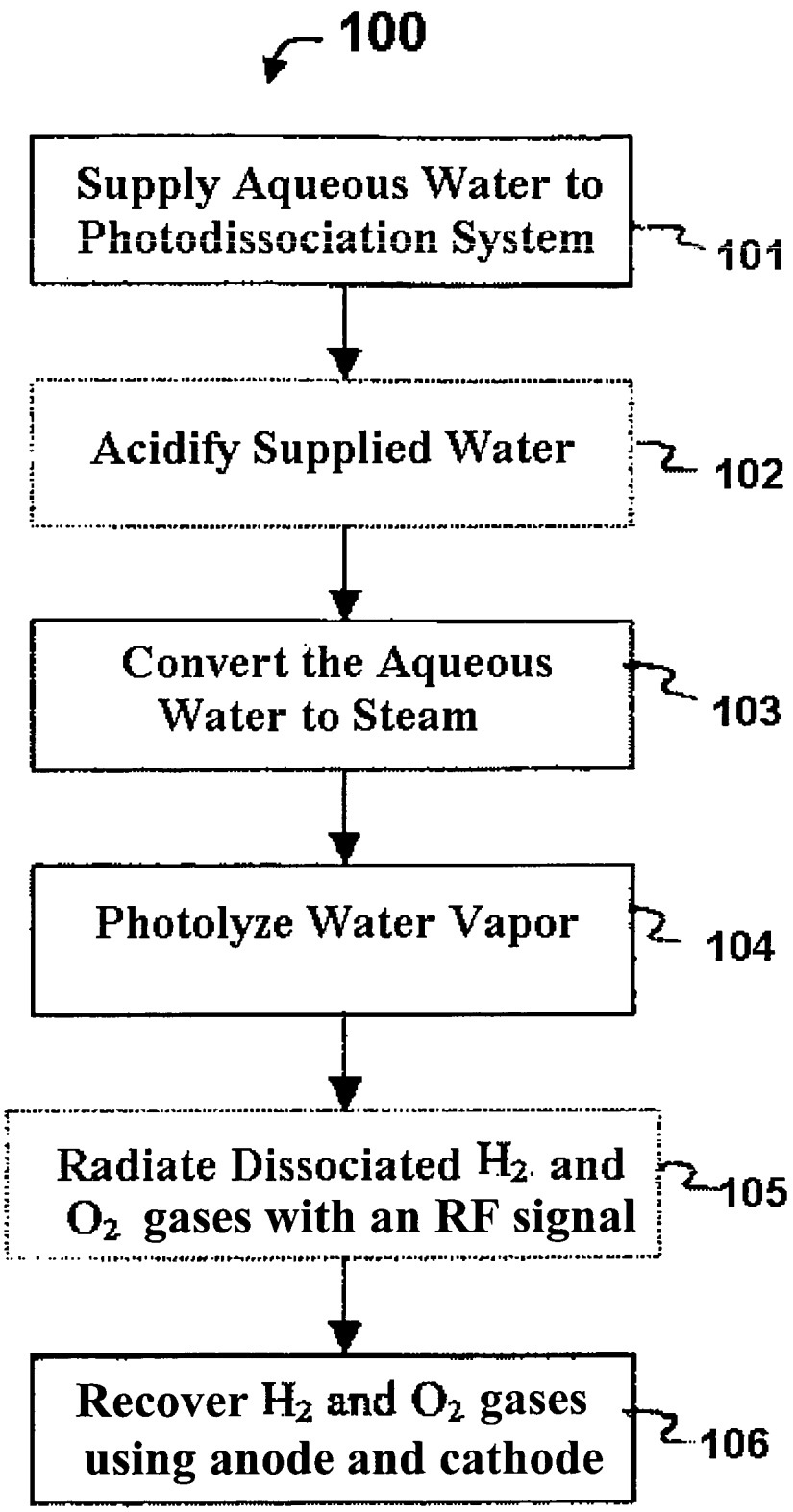
FIG. 1A shows a method employing ultra fast dissociation of water molecules in accordance with the present invention.

For clarity, previously described features are identified by their original reference numerals.

DETAILED DESCRIPTION

The energy required to dissociate the water molecule has previously been cost prohibitive to obtain hydrogen as a fuel, as the energy required to produce the $H_2$ fuel has been greater than the energy provided by the $H_2$ fuel produced. The present invention now describes a system which utilizes molecular water in a controlled state, specifically acidic water vapor, to more efficiently produce $H_2$ fuel. Acidic water, which includes the proton acid $H_3O^+$, is vaporized to produce the dihydronium molecule $H_5O_2$. The dihydronium molecule $H_5O_2$ requires much less energy to split compared to $H_2O$, as the dihydronium molecule presents a much larger target for photodissociation, and its bonds lengths are stretched in its vapor phase state.

Previous drawbacks of photodissociation systems have included the almost immediate recombination of the $H_2$ and $O_2$ constituents. The present invention employs a radiolysis approach in which the dissociated $H_2$ and $O_2$ constituents are bombarded with RF frequency ionizing radiation to inhibit their recombination, thereby resulting in higher conversion efficiency.

Additionally, the new photolysis cell presented herein has the capability of employing much smaller and cheaper near-IR light sources compared to UV sources used in conventional photodissociation systems. The new photolysis cell uses a lensing refraction arrangement in which an undulated surface on the photolysis cell wall is coated with an optically reflective material, the arrangement effectively reducing the wavelength of a near-infrared laser to the UV range. These and other features of the present invention will now be described in conjunction with the identified drawings below.

I. Photodissociation Methodology and Exemplary System

FIG. 1A illustrates a first method for affecting the ultra fast photodissociation of a water molecule in accordance with one embodiment of the present invention. Initially at 101, aqueous water is supplied to a photodissociation system, an embodiment of which is shown and described in FIG. 1B below. The supplied water may be from any source, such as a well, a lake, or an ocean as will be described further below.

In a particular embodiment of the invention, the supplied water is acidified at 102 to facilitate photodissociation. The acidification step 102 may include using a reverse osmosis process, or a similar technique to lower the water's pH. The water's pH may be reduced to within a range of 1.1 to 6.9, more preferably within a range of 3.0 to 5.5, and even more preferably within a range of 4.0 to 5.0. In the instance in which the supplied water is already acidic, this process may not be required, or the process may be scaled back to add the acidity level desired.

The invention is not limited to the use of acidic water or water vapor, and water of any pH may be used in accordance with the invention herein.

Subsequently at 103, the aqueous water is heated and converted into an water vapor, most preferably between the temperatures of 120 and 210° C. In the aforementioned embodiment in which the supplied water is acidified, the heating process produces an acidic water vapor. Producing water vapor at this relatively low temperature provides advantages, as the $H_2$ gas is much more stable, and subsequent processing equipment operates at reduced temperatures, lowering their cost and extending their life cycles.

At 104, the water vapor is photolyzed into dissociated $H_2$ and $O_2$ gases, a process which is further described below. At 105, the dissociated $H_2$ and $O_2$ gases are radiated with an RF signal, which operates to inhibit recombination of the $H_2$ and $O_2$ gases. Finally at 106, the dissociated $H_2$ and $O_2$ gases are recovered, in one embodiment using an anode to attract the negative-charged $O_2$ gas, and a cathode to attract the positively-charge $H_2$ gas. These processes are described in greater detail below.

Figure 1B:
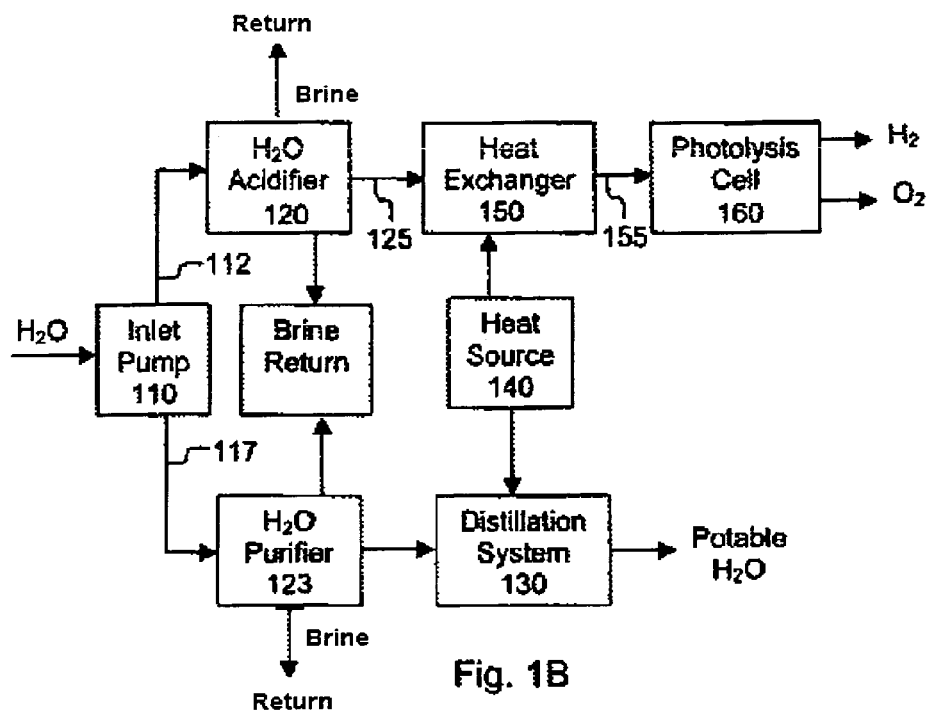
FIG. 1B shows a simplified block diagram of a photodissociation system employing the ultra fast dissociation method illustrated in FIG. 1A in accordance with the present invention.

FIG. 1B shows a simplified block diagram of a photodissociation system employing method 100 illustrated in FIG. 1A. The exemplary system illustrates a combined photolysis/water distillation system and includes a pump 110, a water acidifier 120, a water purifier 123, a distillation system 130, a heat source 140, a heat exchanger 150, and a photolysis cell 160.

Initially in the process, water, (e.g., seawater) is supplied to the system through an inlet using a pump 110. A portion of the pumped water is output to the distillation branch (potable water) through branch 117 and a second portion supplied to the photolysis system through branch 112. The distillation branch 117 includes a water purifier 123 and a distillation system 130 operable to remove impurities and reduce the water's salinity to potable levels. In one embodiment, a reverse osmosis filtration system functions as the water purifier 123, and a heat exchanger is employed as the distillation system 130.

As shown, the photolysis branch includes a water acidifier 120, which, in one embodiment, is a reverse osmosis filtration system. In a specific embodiment, the supplied seawater is passed through the reverse osmosis membrane twice to remove impurities, salt, and lower the pH of the resulting water to approximately 4.5. The resulting water consists of $H_3O^+$ (proton acid), herein referred to as "acidic water" 125. The acidic water 125 is supplied to a heat exchanger 150, which produces steam, herein referred to as an "acidic water vapor" 155. The heat exchanger 150 may be supplied heat from any conventional heat source, and in a specific example, natural gas-fueled molten carbonate fuel cells are used. In such an embodiment, the molten carbonate fuel cells power one or more components of the system, and the by-product heat generated by the fuel cells is supplied to the heat exchanger 150 to produce the acidic water vapor 155. Of course, other heat sources may be used alternatively or in addition in other embodiments of the present invention.

The acidic water vapor 155 includes $H_5O_2$ dihydronium radical ions, which, as noted above, are much more efficiently dissociated. The acidic steam 155 is supplied to a photolysis cell 160 which is operable to convert the acidic water vapor 155 to hydrogen gas $H_2$ and oxygen gas $O_2$. Several embodiments of the photolysis cell are described in greater detail below.

In a specific embodiment, the described method 100 (FIG. 1A) is accomplished using a high capacity system operable to produce 20,000 moles/minute of $H_2$ fuel. In this embodiment, the pump 110 is a high capacity pump operable to supply on the order of 10 million gallons of seawater per day, examples of which are available from the Liquid Handling Systems Corporation of Santa Ana, Calif. The water acidifier 120 and water purifier 123 are reverse osmosis filtration systems operable to process 5 MGD permeate (50% recovery), such as units available from Koch Membrane Systems, Inc. of San Diego, Calif. The heat source 140 is one or more molten carbonate fuel cells operable to generate approximately 250 kW of power, and operate at around 1200° F. Exemplary units are available from Fuel-Cell Energy, Inc. of Danbury, Conn. The heat exchanger 150 is operable to produce the acidic water vapor at between 120–210° C. between 7–10 psi (0.5–0.7 bar); Tranter, Inc. of Wichita Falls, Tex. manufactures exemplary units. Those skilled in the art will appreciate that the present invention is not limited to a system of any particular scale, and systems of smaller or larger size may be constructed under alternative embodiments.

II. Photolysis Cell

The photolysis cell is operable to dissociate $H_2$ and $O_2$ from the water or water vapor molecules contained therein. In a specific embodiment, the water and water vapor are acidified in order to facilitate dissociation. In a further embodiment, the photolysis cell includes a wavelength conversion process by which an optically reflective coating and a corrugated reflective bottle wall are used to convert light of wavelengths longer than 246 nm to light at or below 246 nm, 246 nm representing the wavelength threshold for dissociating water molecules on a one photon per molecule basis. Radiolysis can be additionally used to inhibit $H_2$ and $O_2$ recombination by maintaining these constituents in a charged state with ionizing radiation. These and other features are further illustrated in the figures presented herein.

Figure 2:
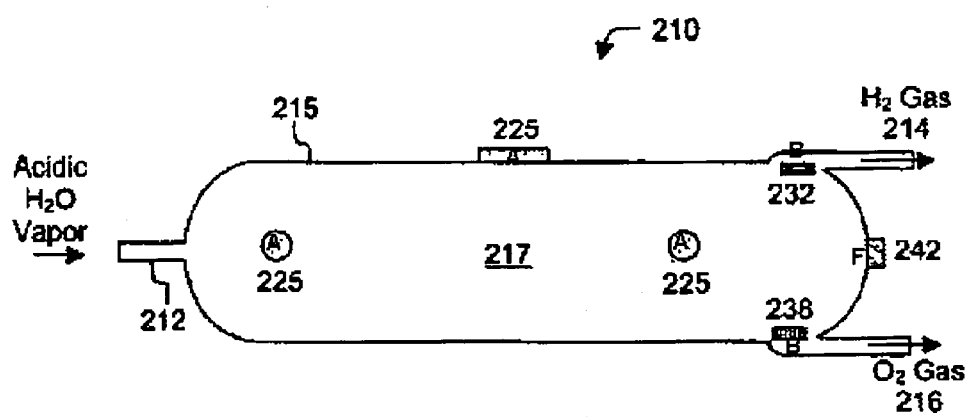
FIG. 2 illustrates a single stage photolysis cell in accordance with one embodiment of the present invention.

FIG. 2 illustrates a single-stage photolysis cell in accordance with one embodiment of the present invention. The photolysis cell includes a photolysis bottle 210 having an inlet 212 configured to receive water molecules, an $H_2$ outlet 214 configured to output $H_2$ gas, and an $O_2$ outlet 216 configured to output $O_2$ gas. The photolysis bottle 210 has an interior region 217 defined by a bottle wall 218 having an inner surface 213 and an outer surface 215. In a specific embodiment, the photolysis bottle 210 is generally cylindrical in shape with parabolic-shaped ends, has a volume of 0.5–3 liters, and is constructed from fused quartz silica, although bottles of other shapes, volumes, and composition may be used in alternative embodiments. In the preferred embodiment, the photolysis cell inlet is configured to receive water vapor (which can be acidic in one embodiment), although in an alternative embodiment, liquid phase water may be supplied and converted into a vapor within the photolysis cell. In such an embodiment, the inlet 212 is configured to receive liquid phase water.

The bottle 210 further includes one or more light ports 225 located on or near the wall's outer surface 215 and operable to guide light of a predefined wavelength(s) therethrough into the interior region 217. The light ports 225 may connect to a transmission medium, such as a fiber optic cable, or may itself comprise a light source that generates the light to be injected into the interior region 217. In the preferred embodiment, the light ports comprise fiber optic cables coupled to one or more remotely light sources operating at one or more wavelengths between 1500 nm and 246 nm. In a further preferred embodiment, the aforementioned light source is a laser diode operating in the range of 820 nm, examples of which are available from Power Technology Incorporated of Little Rock, Ark. Of course, other light sources such as conventionally known lasers (gas, solid state, etc.), light emitting diodes, lamps, and natural sources such as solar radiation may be used alternatively, or in addition in alternative embodiments under the present invention.

As shown, the bottle 210 includes an optically reflective coating disposed on the wall's outer surface 215 which is operable to reflect light of one or more wavelengths back into the interior region 217. Dissociation efficiency is enhanced by reflecting light within the interior region 217 one or more times, as will be further described below. In the preferred embodiment, the reflective coating is operable to reflect light between 1500 nm and 150 nm, and further preferably between 850 nm and 150 nm. Various materials may be used. In one embodiment, bare aluminum, which may form the bottle wall 218 is used to provide the desired reflectivity. In the exemplary embodiment in which the bottle is constructed from fused quartz silica, the reflective coating may consist of a di-electric metal oxide, such as hafnium dioxide, silicon dioxide, aluminum oxide, and similar materials. The reflective coating may be patterned around the light ports 225 so as to permit injection of the light signal into the interior region 217. In a specific embodiment, the bottle wall 218 includes an undulated outer and/or inner surface, as will be described in greater detail with reference to FIGS. 3A and 3B below.

In an alternative embodiment under the present invention, a light signal having a wavelength shorter than 246 nm is used to illuminate the water vapor. For example, conventional known lasers, light emitting diodes, and other sources producing light in the deep UV and extreme UV ranges may be used. In such an embodiment, the light source, the light transmission means (e.g., fiber optic cables), and optical ports are selected to produce/support the desired wavelength. In this configuration, the aforementioned wavelength conversion features of the undulated surface and optically reflective coating may be omitted, although these features may be used to further increase dissociation efficiency.

The bottle 210 additionally includes a cathode 232 located proximate to the $H_2$ outlet, and an anode located proximate to the $O_2$ outlet. The cathode and anode 232 and 238 are negatively and positively charged electrodes, respectively, which are operable to liberate the positively charged $H_2$ molecules and negatively charged $O_2$ molecules. Either electrode may be located within the interior region 217 of the bottle 210, or on/proximate to the bottle wall's outer surface 215. In the latter case, the electrode's voltage potential is electrically-coupled (electrostatically or electromagnetically) through the wall 218 to the interior region 217 to liberate the $H_2$ or $O_2$ molecules therein. The latter implementation is particularly advantageous, as the externally located electrodes exhibit longer life cycles, require less maintenance, and are more conveniently replaced. In a specific embodiment, the cathode 232 and anode 238 consist of Schottky barrier rectifiers. Those skilled in the art will readily appreciate that electrodes of alternative construction may be used in other embodiments under the present invention.

The bottle 210 further includes an RF port 242 located on or near the wall's outer surface 215, the RF port being configured to electromagnetically couple an RF frequency signal of predefined frequency(ies) into the interior region 217. In one embodiment, the supplied frequency(ies) is selected to substantially match the resonant frequency(ies) of the water vapor molecule so as to inhibit recombination of the $H_2$ and $O_2$ molecules after dissociation. In a second embodiment, the amplitude and frequency of the RF signal is selected so as to bombard the $H_2$ and $O_2$ constituents with ionizing radiation, thereby maintaining their present dissociated state. The RF port 242 may comprise any conventional structure operable to launch the desired RF frequency (ies) signal into the interior region 217, such structures including a TEM (transverse electromagnetic) structure such as coaxial cable, or TE or TM structures, such as a waveguide. Further alternatively, the RF port 242 may itself comprise a RF signal source itself which produces a signal (or signals) substantially at the desired amplitude and frequency(ies). In a specific embodiment, the RF port 242 comprises a variable oscillator (such as a voltage controlled oscillator) which can be set to output one frequency or a range of frequencies, preferably between 5 GHz and 96 GHz at amplitudes ranging up to 25 watts, and more preferably at 48 GHz and 0.5 to 5 watts.

Figure 3A:
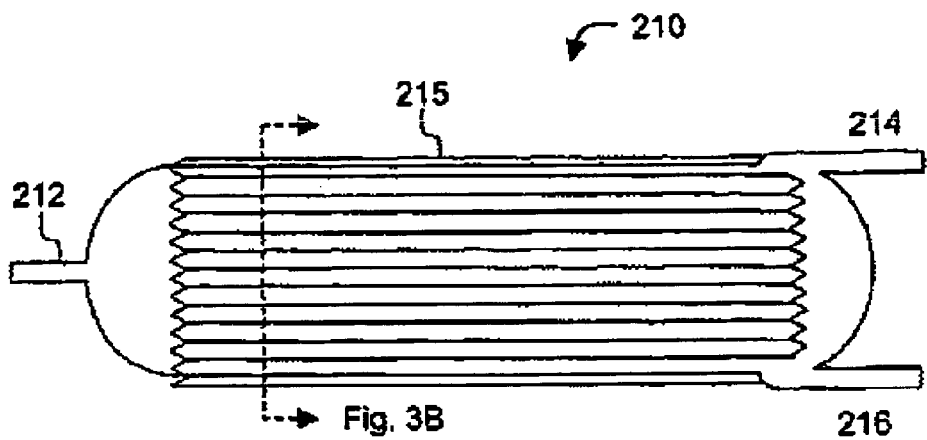
FIGS. 3A and 3B illustrate side and cross-sectional views, respectively, of a photolysis bottle in accordance with one embodiment of the present invention.
Figure 3B:
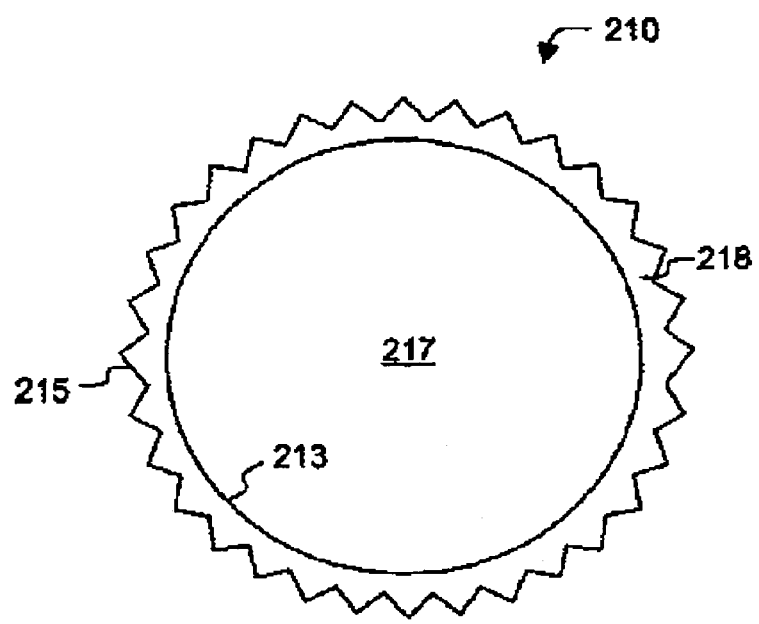

FIGS. 3A and 3B illustrate side and cross-sectional views, respectively, of a specific embodiment of the photolysis bottle in accordance with the present invention. As shown, the bottle wall 218 includes an undulated outer surface 215 (viewed cross-sectionally). In particular, the shape is corrugated, having edges which are formed by 45° angles, thereby shifting the incident angle of light reflecting thereupon from 0° to 45°. When the above-described optically reflective coating is deposited on the wall's outer surface 215, the light reflected therefrom will exhibit a wavelength approximately 10% shorter as described in the publication "The Photonics Design and Applications Handbook," 48th International Ed., 2002, published by Photonics Spectra., herein incorporated by reference. Accordingly, longer wavelength light can be injected into the interior region 217 and be converted to shorter wavelengths by reflecting the supplied light one or more times within the interior region 217. In a specific embodiment, a 820 nm light source is used to supply the initial light wave, the injected light undergoing 12 reflections to reach an effective wavelength of 233 nm to more efficiently dissociate $H_2$ and $O_2$ from the acidic water vapor. Of course, other arrangements are possible in which light of longer or shorter wavelengths are supplied and correspondingly a larger or smaller number of reflections are needed to reach the 246 nm dissociation threshold. The wall's surface geometry is not limited to the particular corrugated surface shown, and other undulated-shaped surfaces (e.g., corrugations formed at other angles, smooth corrugations, etc.) may be employed in alternative embodiments. Further alternatively, the undulated surface may be formed on the inside surface 213 of the bottle wall 218, with the wall's outer surface being relatively flat, or still alternatively, the undulated feature may be formed on both the inner and outer surfaces. Additionally, the optically reflective coating may be deposited on either the inside or outside surfaces of the bottle wall 218 to provide the requisite wavelength conversion. In embodiments in which the undulated surface is formed on the inside surface 213 of the bottle wall 218, the optically reflective coating may be deposited on the inside surface 213 if it is resistant to the effects of the water vapor, especially so when the water vapor is acidic.

Figure 4:
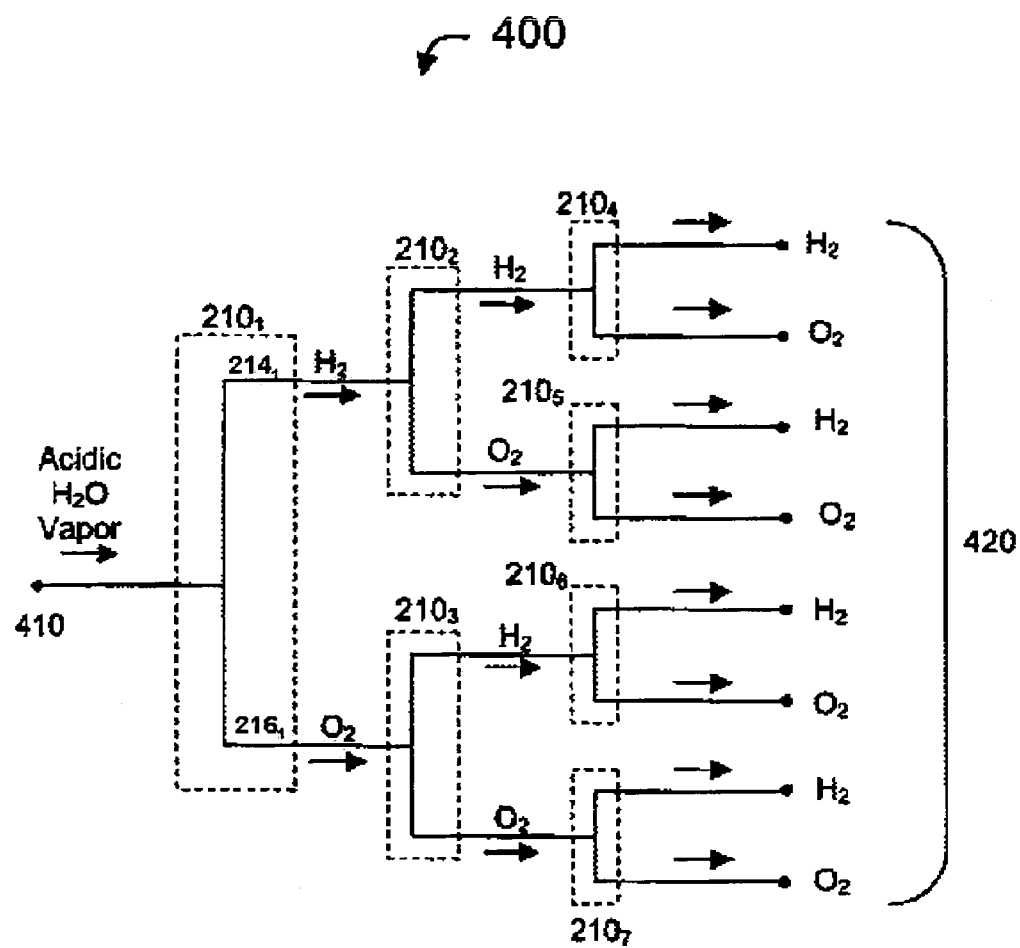
FIG. 4 illustrates a multi-stage photolysis cell in accordance with one embodiment of the present invention.

FIG. 4 illustrates a multi-stage photolysis cell 400 in accordance with one embodiment of the invention. The multi-stage cell 400 provides higher purity $H_2$ and $O_2$ gas 420 as the non-dissociated water vapor and subsequent spur reactions contained in previous processing steps is reduced in successive stages.

The illustrated embodiment shows a three-stage, seven cell arrangement in which an initial water vapor input 410 is processed into high purity $H_2$ and $O_2$ gas 420. The photolysis cells are coupled (i.e., connected either directly or via one or more interposed elements) to the preceding bottle's outlet port. The first stage consists of a single cell $210_1$, which feeds each of two second-stage cells $210_2$ through branch $214$, and $210_3$ through branch $216_1$, each of which, in turn, feeds four third-stage cells $210_4$–$210_7$. In each successive stage, non-dissociated water vapor contained in the $H_2$ or $O_2$ output is further reduced. In this manner, the $H_2$ and $O_2$ gas provided at the output 420 is of high purity. Each of the corresponding $H_2$ and $O_2$ outputs can be combined and stored, used to power the system's fuel cells, or otherwise processed as required.

Each of the illustrated cells may comprise the aforementioned photolysis cells 210 described above, or their alternatives. Further, all of the cells may be identical in construction and operation, or alternatively, there may be variation, for instance, as to bottle size and construction, photonic operation (e.g., variation in wavelengths used), and/or RF signal operation (e.g., variation in amplitude or frequency of the RF signal, if employed). In a particular embodiment, the first stage cell is substantially 3 liters in volume, the second stage cells are 1.5 liters, and the third stage cells are 1.0 liters in volume, each cell operating under substantially the same photonic and RF signal conditions, i.e., are provided substantially the same wavelength of light and RF signal frequency.

The foregoing embodiments are provided to illustrate specific aspects of the invention and are not intended to provide, nor do they legally establish the boundaries of the present invention, the metes and bounds of which are hereby established by the following claims:

The invention claimed is:

1. A method for the ultra-fast dissociation of water molecules into $H_2$ and $O_2$ gases, the method comprising:
producing a water vapor,
within the interior region of a photolysis bottle, illuminating the water vapor with a light signal to dissociate the $H_2$ and $O_2$ gases from the water vapor;
radiating the dissociated $H_2$ and $O_2$ gases with an RF signal; and recovering the dissociated $H_2$ and $O_2$ gases.

2. The method of claim 1, wherein the water vapor comprises an acidic water vapor.

3. The method of claim 1, wherein the wavelength of the light signal is shorter than 246 nm.

4. The method of claim 1, wherein the wavelength of the light signal is 246 nm or longer in length.

5. The method of claim 4, wherein illuminating the water vapor with a light signal comprises injecting the light signal into a photolysis bottle containing the water vapor, wherein the photolysis bottle comprises an undulated wall, the undulated wall having a coating disposed thereon which is reflective to the wavelength of light injected therein.

6. The method of claim 1, wherein the RF signal comprises a signal in the range of 5 GHz to 96 GHz.

7. The method of claim 6, wherein the RF signal comprises a signal operating substantially at 48 GHz.

8. The method of claim 1, wherein recovering the dissociated $H_2$ and $O_2$ gases from the photolysis bottle comprises:
locating a cathode at a first position within the interior region of the photolysis bottle to recover the positively-charged $H_2$ gas; and
locating an anode at a second position within the interior region of the photolysis bottle
to recover the negatively-charged $O_2$ gas.

9. The method of claim 1, wherein recovering the dissociated $H_2$ and $O_2$ gases, comprises:
locating a cathode at a first position outside of the interior region of the photolysis bottle;
electrically-coupling the negative voltage potential of the cathode to the dissociated $H_2$ and $O_2$ gases to recover the positively-charged $H_2$ gas;
locating an anode at a second position outside of the interior region of the photolysis bottle; and
electrically-coupling the positive voltage potential of the anode to the dissociated $H_2$ and
$O_2$ gases to recover the negatively-charged $O_2$ gas.

10. A method for the ultra-fast photodissociation of water molecules into $H_2$ and $O_2$ gases, the method comprising:
producing a water vapor;
within the interior region of the photolysis bottle, illuminating the water vapor with a light signal to dissociate $H_2$ and $O_2$ gases from the water vapor;
radiating the dissociated $H_2$ and $O_2$ gases with an RF signal; and
recovering the dissociated $H_2$ and $O_2$ gases using an anode and a cathode.

11. The method of claim 10, wherein the water vapor comprises acidic water vapor.

12. The method of claim 10, wherein the wavelength of the light signal is shorter than 246 nm.

13. The method of claim 10, wherein the wavelength of the light signal is 246 nm or longer.

14. The method of claim 13, wherein illuminating the water vapor with a light signal comprises injecting the light signal into a photolysis bottle containing the water vapor, wherein the photolysis bottle comprises an undulated wall, the undulated wall having a coating disposed thereon which is reflective to the wavelength of light injected therein.

15. The method of claim 10, wherein the RF signal comprises a signal ranging in frequency from 5 GHz to 96 GHz.

16. The method of claim 15, wherein the RF signal comprises a signal operating substantially at 48 GHz.

17. The method of claim 10, wherein recovering the dissociated $H_2$ and $O_2$ gases using an anode and a cathode comprises:
locating a cathode at a first position within the interior region of the photolysis bottle to recover the positively-charged $H_2$ gas; and
locating an anode at a second position within the interior region of the photolysis bottle to recover the negatively-charged $O_2$ gas.

18. The method of claim 10, wherein recovering the dissociated $H_2$ and $O_2$ gases using an anode and a cathode comprises:
locating a cathode at a first position outside of the interior region of the photolysis bottle;
electrically-coupling the voltage potential of the cathode to the dissociated $H_2$ and $O_2$ gases contained within interior region of the photolysis bottle to recover the positively-charged $H_2$ gas;
locating an anode at a second position outside of the interior region of the photolysis bottle; and
electrically-coupling the voltage potential of the anode to the dissociated $H_2$ and $O_2$ gases contained within interior region of the photolysis bottle to recover the negatively-charged $O_2$ gas.

* * * * *